Aug. 13, 1929.  R. H. WILMETH  1,724,155
ELECTRICALLY WOUND CLOCK
Original Filed Oct. 4, 1926

Inventor
Roscoe H. Wilmeth
By John L. Jameson
Attorney

Witness
Milton Lenoir

Patented Aug. 13, 1929.

1,724,155

UNITED STATES PATENT OFFICE.

ROSCOE H. WILMETH, OF SPRINGFIELD, ILLINOIS, ASSIGNOR TO SANGAMO ELECTRIC COMPANY, OF SPRINGFIELD, ILLINOIS, A CORPORATION OF ILLINOIS.

ELECTRICALLY-WOUND CLOCK.

Original application filed October 4, 1926, Serial No. 139,254. Divided and this application filed May 23, 1927. Serial No. 193,390.

The present invention relates to electrically wound clocks, and is divisional of my copending application, Ser. No. 139,254, filed October 4, 1926. More particularly the invention relates to clocks wherein the energy for winding the main spring is derived from a small electric motor, generally incorporated in the clock.

Heretofore, in clocks of this type, the customary method of controlling the motor, i. e., stopping and starting the same with the winding and unwinding of the clock spring, has been to open and close the motor circuit, through switch mechanism made responsive to the tension of the main spring, or actuated by the winding and unwinding of the spring through a predetermined number of turns. Electrical contacts requiring frequent opening and closing are always subject to pitting, arcing, etc., and hence these prior clocks have not been commercially successful, owing to the imperative necessity of a clock giving reliability of operation over indefinite periods of time, without service or attention.

The fundamental object of the present invention is to obviate the difficulties inherent in the use of electrical contacts by providing an electrically wound clock in which the control exercised over the motor is in the nature of a mechanical braking thereof rather than an opening and closing of the motor circuit. Small motors of the induction type are now obtainable, which will permit of braking down to a dead stall without injury to the motor and without any objectionable load fluctuation being imposed on the line supplying the motor. Such motors can be slowed down, stopped and started indefinitely through braking retardation without deterioration of any of the working parts of the clock mechanism or motor.

A further object of the invention is to provide improved braking mechanism which will be sensitive in its action, to the end of keeping the winding and unwinding limits of the clock spring within a comparatively small range, whereby an approximately uniform tension is always maintained on the clock spring. The braking control forming the essence of this invention enables this tensional variation of the clock spring to be maintained between much closer limits than is practicable in a clock wherein the motor circuit is opened and closed by contact mechanism. Because of the pitting and deterioration of the contacts in these latter types of electrically wound clocks it is not practicable to open and close the motor circuit with the frequency required to obtain such close regulation of the clock spring tension. This close regulation of the clock spring tension, as obtained by the present braking control, augments the time keeping accuracy of the clock.

Referring to the accompanying drawing illustrating a preferred embodiment of my invention:

Figure 1:
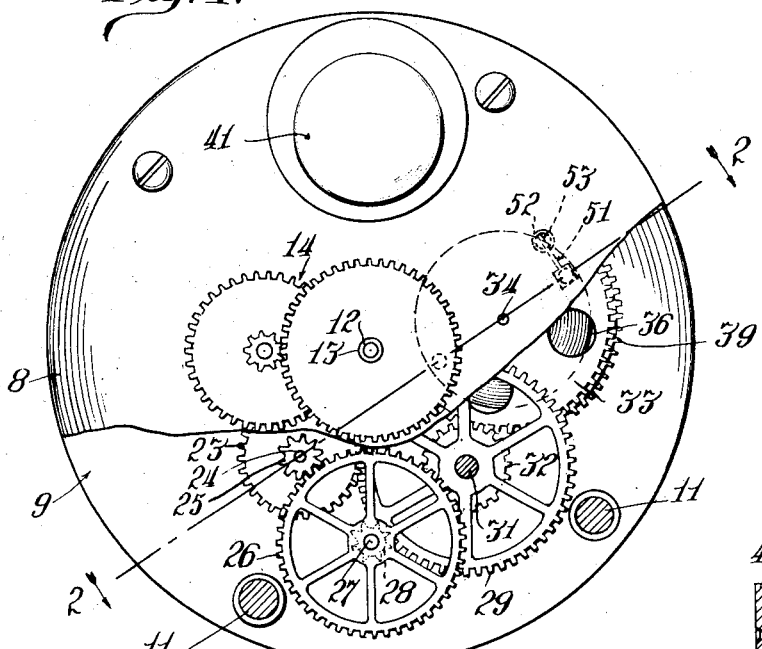
Fig. 1 is a front or face view of a clock movement embodying the invention, the front mounting plate being broken away to illustrate part of the gear train.
Figure 3:
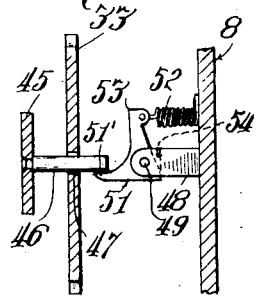
Fig. 3 is a detail sectional view of the braking mechanism taken on the plane of the line 3—3 of Fig. 2.
Figure 2:
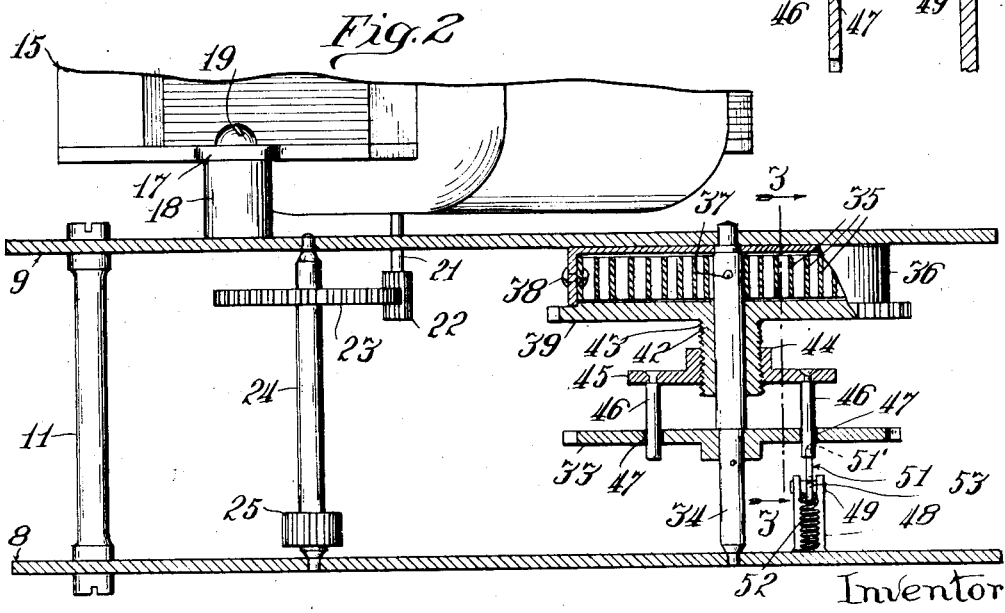
Fig. 2 is a transverse sectional view taken on the plane of the line 2—2 of Fig. 1, the major part of the gear train being omitted from this figure for clarity of illustration.

The clock movement may be of any preferred design or construction, the present invention being capable of embodiment in practically any type of movement with very little modification of standard construction. As exemplary of a typical construction of clock, I have shown in Figs. 1 and 2 a design wherein the gear train, main spring, etc., are all mounted in a frame structure comprising front and rear disc-like plates 8 and 9, held in spaced relation by posts 11. The minute hand (not shown) is carried on a central arbor 12, and the hour hand is supported on a sleeve 13 which is connected to the minute hand arbor through the usual speed reducing gearing 14, as is typical of conventional clock practice. The electric motor 15, which winds the main spring is preferably mounted on the outer side of the rear plate 9, the frame of the motor having extending lugs 17 which are secured to spacing posts 18 by screws 19. This motor is preferably of a small induction type, capable of being connected directly to an ordinary lighting circuit. The armature shaft 21 of the motor extends through the back plate 9 and carries a small pinion 22 which meshes with a relatively large gear 23 on an arbor 24 pivoted between the end plates.

The reduced speed of the arbor 24 is transmitted through a pinion 25, mounted on this arbor, to a large gear 26 mounted on a second arbor 27, also journaled in the end plates 8 and 9. A pinion 28 mounted on this second arbor transmits the reduced speed thereof to a large gear 29 mounted on a third arbor 31, also journaled at its ends in the front and rear plates. On this third arbor is a pinion 32 which meshes with a large gear 33 which is pinned to the main spring arbor 34. The second and third arbors 27 and 31, together with their respective gears, have been omitted from Fig. 2 to avoid obscuring the illustration of the braking mechanism. As shown in this figure, the main spring 35 and spring barrel 36 are mounted on the main spring arbor 34, preferably adjacent to the back plate 9, the spring barrel being freely rotatable on the arbor. The inner convolution of the main spring 35 is suitably secured to the arbor, the pin 37 representing such connection, and the outer convolution is suitably secured to the spring barrel 36, as by the pin 38, whereby the tension of the spring operates to rotate the spring barrel, and also the ring gear 39 which extends from the periphery thereof. This ring gear meshes with a pinion (not shown) mounted on the minute hand arbor 12. Any suitable escapement mechanism 41 is operatively connected to the minute hand arbor through a suitable gear train, not shown. Referring now to the construction of the brake mechanism, it will be seen from Fig. 2 that one wall of the spring barrel 36 is formed with an axial hub 42 which extends over a portion of the main spring arbor 34 and which is threaded externally at 43 to receive a threaded collar 44. A flange 45 projecting from this collar has longitudinally extending pins 46 riveted therein. These pins extend through holes 47 in the arbor driving gear 33, whereby the collar is compelled to rotate with the gear 33, but is permitted to move axially along the threaded hub 42. Projecting from the front plate 8, or from any other suitable support, is a bracket 48 in which is pivoted at 49 a pawl or stop member 51. The nose 51' of this pawl is disposed at a point to be engaged by one of the pins 46 when the collar 44 is threaded outwardly along the hub 42 to a predetermined degree. The pawl 51 has a yieldable braking action on the pins 46 by virtue of a spring 52 which is connected between a laterally extending arm 53 of the pawl and the mounting plate 8. This spring normally holds the nose 51' of the pawl in position to be engaged by the pins 46, as above described.

In the operation of the clock, the energization of the motor 15 will drive through the gear train previously described, which will operate to impart a slow speed winding rotation to the main spring arbor 34. As the arbor driving gear 33 is revolving it is also revolving the collar 44 on the threaded hub 42. With tension existing in the spring 35, the spring barrel will, of course, be rotating in the same direction as the arbor 34, but the rotation of this spring barrel, and hence of the threaded axial hub 42, will be so slow that the hub may be considered as remaining practically stationary. Hence the rotation of the collar 44 on the threaded hub 42 will result in the collar screwing outwardly along the hub towards the braking pawl 51, the thread 43 having this direction of lead. When the spring has been wound to a predetermined tension, or through a predetermined angular distance, one of the pins 46 strikes the nose 51' of the pawl, thereby gradually reducing the speed of rotation of the arbor 34 through the resilient pressure of the pawl and finally resulting in the arbor being brought to a dead stop. The gradual retardation and stopping of the arbor 34 of course causes a similar gradual retardation and stopping of the electric motor 15. With the main spring arbor 34 and collar 44 inert as the result of the aforesaid braking action, the continued rotation of the spring barrel 36 and of the threaded hub 42 will gradually screw the collar 44 back along the hub towards the spring barrel. When the spring barrel has revolved through a given angular distance, corresponding to the lower predetermined limit of its spring tension, the pin 46, which is then in engagement with the pawl 51, will be retracted inwardly from the end of the pawl, thereby freeing the arbor driving gear 33 from braking restraint. Thereupon, the motor 15 will resume rotation, resulting in the gear 33 and arbor 34 being revolved until the main spring 35 has again been wound to its predetermined maximum tension, whereupon the previously described braking action will again occur.

It will be observed that the range of pivotal movement of the pawl 51 is determined by the engagement of the back of the pawl with the shoulder or wall 54 of the bracket 48; that portion of the pawl above the pivot 49 engaging this shoulder when the pawl is swung back by the spring 52, and the lower heel portion of the pawl, below the pivot 49, engaging this shoulder when the pawl is swung down by one of the pins 46. The winding interval is determined by the relation of this angular movement of the pawl to the pitch of the thread 43, and also by the number of pins 46, which can be proportioned so that the barrel 36 will make one or more revolutions or merely a fraction of a revolution between winding operations.

In the event of the source of current to the motor being interrupted the reserve tension of the main spring 35 will be sufficient to continue the operation of the clock for a considerable period of time. As soon as current again comes back on the line the motor will rewind the main spring to its previous working tension.

What I claim as my invention and desire to secure by Letters Patent, is—

1. In an electrically wound clock, comprising a clock spring having an arbor and a spring barrel, an electric motor, and means operatively connecting said electric motor with said arbor, the combination of a threaded boss on said spring barrel, a threaded collar engaging over said boss, a driving member rotating with said arbor, pins extending from said collar through holes in said driving member, and a pivotally mounted, yieldable stop member adapted to be engaged by one of said pins when said spring has been wound to a predetermined degree.

2. In an electrically wound clock, comprising a clock spring, an electric motor, and a gear train operatively connecting said motor with said clock spring, the combination of cooperating screw threaded members operatively connected to the opposite ends of said spring to be revolved thereby, a projection on one of said screw threaded members, and a pivotally mounted spring held braking pawl adapted to be engaged by said projection.

3. In an electrically wound clock, comprising a main spring, an arbor to which the inner end of said spring is connected, a spring barrel to which the outer end of said spring is connected, a gear rotating with said barrel for driving the hands of the clock, an electric motor, and a gear train operatively connecting said motor with said arbor, the combination of a rotating threaded member driven by said barrel, a cooperating rotating threaded member driven by said arbor and movable axially along said first named threaded member, a projection carried by said second named threaded member, a stationarily mounted pivoted braking member adapted to be engaged by said projection, and spring means for resisting movement of said braking member with said projection.

ROSCOE H. WILMETH.